United States Patent
Nomura et al.

(10) Patent No.: US 8,120,293 B2
(45) Date of Patent: Feb. 21, 2012

(54) CONTROL APPARATUS FOR OPEN/CLOSE MEMBER AND METHOD FOR CONTROLLING OPEN/CLOSE MEMBER

(75) Inventors: Kazuo Nomura, Toyohashi (JP); Kazuyuki Hirai, Kasugai (JP)

(73) Assignee: ASMO Co., Ltd., Shizuoka-Ken (JP)

( * ) Notice: Subject to any disclaimer, the term of this patent is extended or adjusted under 35 U.S.C. 154(b) by 1006 days.

(21) Appl. No.: 12/052,894

(22) Filed: Mar. 21, 2008

(65) Prior Publication Data

US 2008/0234894 A1   Sep. 25, 2008

(30) Foreign Application Priority Data

Mar. 23, 2007   (JP) .................. P2007-076993

(51) Int. Cl.
   *H02P 1/00*   (2006.01)

(52) U.S. Cl. ........................................ 318/282

(58) Field of Classification Search .......... 701/36; 318/282–286, 266, 280, 434, 445, 466; 703/7
   See application file for complete search history.

(56) References Cited

U.S. PATENT DOCUMENTS 4,544,865 A * 10/1985 Sharp .............................. 318/53
6,426,604 B1 * 7/2002 Ito et al. ........................ 318/466
6,505,127 B1 * 1/2003 Togami ............................ 702/33
2003/0122516 A1 * 7/2003 Mukai et al. .................. 318/468
2004/0212338 A1 * 10/2004 Shimizu et al. ............... 318/469

FOREIGN PATENT DOCUMENTS

| JP | 7-224572 | 8/1995 |
| JP | 2002-103979 | 4/2002 |
| JP | 2003-253957 | 9/2003 |

* cited by examiner

*Primary Examiner* — Mary Cheung
*Assistant Examiner* — Majdi Alsomiri
(74) *Attorney, Agent, or Firm* — Occhiuti Rohlicek & Tsao LLP

(57) ABSTRACT

An apparatus that controls opening and closing of a roof glass is disclosed. The apparatus includes a drive motor that is actuated to selectively open and close the roof glass. The apparatus stores a count value that changes in correspondence with operation of the drive motor. The apparatus detects the number of cycles of reset starting and determines whether the detected number of the reset starting cycles is in a predetermined acceptable range. The apparatus switches initial setting, in accordance with which the relative relationship between the actual open/closed position of the roof glass and the count value is determined, to a non-set state if it is determined that the number of the reset starting cycles exceeds the acceptable range.

5 Claims, 6 Drawing Sheets

US 8,120,293 B2

CONTROL APPARATUS FOR OPEN/CLOSE MEMBER AND METHOD FOR CONTROLLING OPEN/CLOSE MEMBER

CROSS-REFERENCE TO RELATED APPLICATIONS

This application claims priority to Japanese Application No. 2007-076993, filed Mar. 23, 2007. The content of which is hereby incorporated by reference in its entirety.

BACKGROUND OF THE INVENTION

The present invention relates to an apparatus and a method for controlling operation of an open/close member such as a roof glass or a window glass of an automobile.

Japanese Laid-Open Patent Publication No. 2003-253957 discloses a sun roof apparatus that controls opening/closing of a roof glass of an automobile. The sun roof apparatus detects an open/closed position of the roof glass by detecting a rotation cycle of a drive motor that operates to selectively open and close the roof glass. The sun roof apparatus includes, for example, a rotation sensor that outputs a pulse signal in correspondence with rotation of the drive motor. A controller counts rises or falls of the pulse signal provided by the rotation sensor and detects the open/closed position of the roof glass in accordance with the count value. In this manner, the controller controls operation of the roof glass in correspondence with the open/closed position of the roof glass. The count value, in accordance with which the open/closed position of the roof glass is detected, is stored in a RAM of the controller as learned data that is rewritten each time the count value changes.

As is publicly known, the RAM is a volatile memory from which the data is deleted when the power supply is cut. Thus, if, for example, reset starting in which the voltage of the power supply to the controller falls to a value smaller than or equal to a predetermined level and then re-increases to a value greater than the predetermined level occurs, it is checked whether the learned data, or the count value, stored in the RAM is retained normally.

If the roof glass is operated through manipulation of a manipulating switch before the engine of the automobile is started and the engine starter motor is actuated to start the engine while the roof glass is moving, the voltage of the power supply to the controller instantly drops by a great amount to a value smaller than or equal to the predetermined level. In this case, since the voltage drop of the power supply lasts only for a short time, the data stored in the RAM is prevented from being deleted. It is thus determined that the learned data (the count value) is retained normally in the RAM in the reset starting.

However, if the waveform of the pulse signal of the rotation sensor becomes abnormal in such instant drop of the voltage of the power supply, the rises or falls of the pulse signal cannot be counted. Further, even if the waveform of the pulse signal is normal, there may be cases in which the rises or falls of the pulse signal cannot be counted or the RAM cannot be rewritten. In these cases, the count value stored in the RAM remains unchanged despite the fact that the roof glass is actually moving. This causes a difference between the actual open/closed position of the roof glass and the count value, thus bringing about a problem in control.

To solve this problem, if the reset starting occurs, original position setting (initial setting), or initializing and resetting the relationship between the actual open/closed position of the roof glass and the count value, may be performed through manipulation of the manipulating switch by the user. However, it is extremely troublesome for the user to carry out the original position setting each time the reset starting occurs.

SUMMARY OF THE INVENTION

Accordingly, it is an objective of the present invention to provide an apparatus and a method for controlling operation of an open/close member that simplify initial setting.

To achieve the foregoing objective and in accordance with a first aspect of the present invention, an apparatus that controls opening and closing of an open/close member based on a supply of a drive voltage is provided. The apparatus includes a drive motor, a memory, a storage state determining section, a motor state detecting section, a position difference determining section, a number of reset determining section, and a switching section. The drive motor is actuated to selectively open and close the open/close member. The memory stores a count value changing in correspondence with operation of the drive motor. The memory stores the count value each time the count value changes. The storage state determining section determines whether the count value is normally stored in the memory when a reset starting, in which the drive voltage drops to a value smaller than or equal to a predetermined level and then re-increases to a value greater than the level, occurs. The motor state detecting section detects whether the drive motor is in operation. If, in the reset starting, it is determined that the count value is normally stored and it is detected that the drive motor is in operation, the position difference determining section determines that it is likely that there is a difference between an actual open/closed position of the open/close member and the count value stored in the memory. The number of reset determining section detects the number of cycles of the reset starting and determines whether the detected number of the reset starting cycles is in a predetermined acceptable range. The switching section that, if it is determined that the number of the reset starting cycles exceeds the acceptable range, switches an initial setting, in accordance with which the relative relationship between the actual open/closed position of the open/close member and the count value stored in the memory is determined, to a non-set state.

In accordance with a second aspect of the present invention, a method for controlling opening and closing of an open/close member based on a supply of a drive voltage is provided. The method includes: storing in a memory a count value that changes in correspondence with operation of a drive motor operating to selectively open and close the open/close member, each time the count value changes; determining whether the count value is normally stored in the memory in a reset starting, in which the drive voltage drops to a value smaller than or equal to a predetermined level and then re-increases to a value greater than the level; detecting whether the drive motor is in operation; determining that it is likely that there is a difference between an actual open/closed position of the open/close member and the count value stored in the memory if, in the reset starting, it is determined that the count value is normally stored and it is detected that the drive motor is in operation; detecting the number of cycles of the reset starting and determining whether the detected number of the reset starting cycles is in a predetermined acceptable range; and switching an initial setting, in accordance with which the relative relationship between the actual open/closed position of the open/close member and the count value stored in the memory is determined, to a non-set state if it is determined that the number of the reset starting cycles exceeds the acceptable range.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

A sun roof apparatus mounted in an automobile 1 according to a first embodiment of the present invention will now be described with reference to the drawings.

Figure 4:
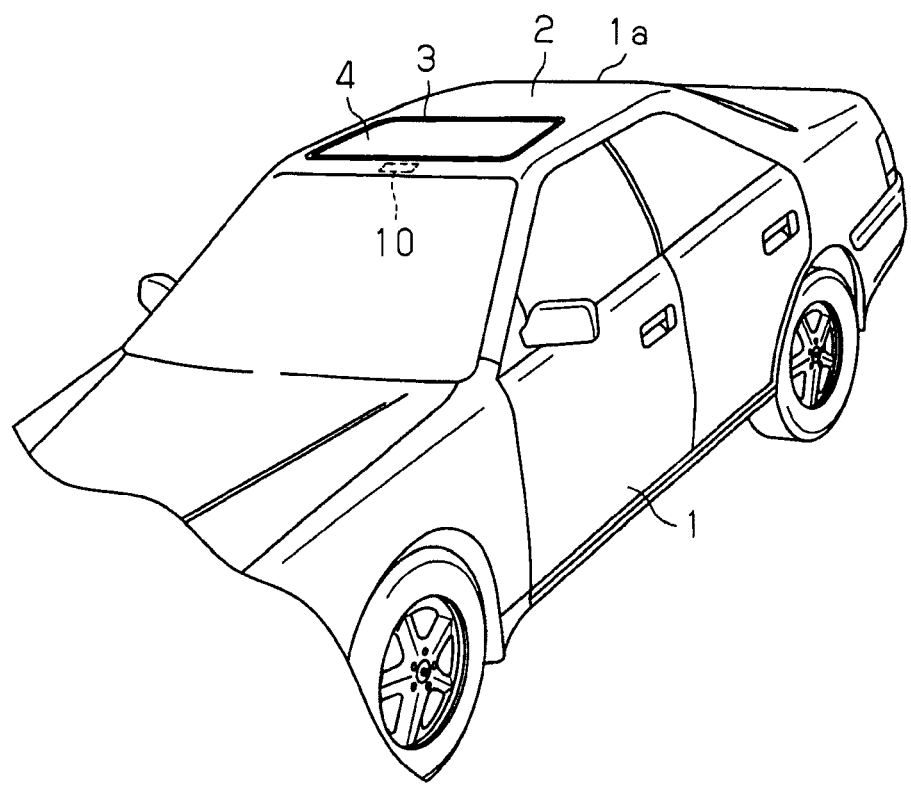
FIG. 4 is a perspective view showing a main portion of an automobile in which the sun roof apparatus of FIG. 1 is mounted.

FIG. 4 is a perspective view showing a main portion of the automobile 1 in which the sun roof apparatus is installed. As shown in FIG. 4, a roof glass 4, which is an open/close member, is provided in a top window 3 formed in a roof panel 2 of the automobile 1. The roof glass 4 is movable in the forward-rearward direction with respect to a vehicle body 1a of the automobile 1 and tiltable in the up-and-down direction with respect to the vehicle body 1a about a rotary shaft extending in the lateral direction of the vehicle at the front end of the roof glass 4 as the point of support. The roof glass 4 is selectively opened and closed through a non-illustrated drive force transmitting mechanism when powered by a drive motor 5 illustrated in FIG. 1. The drive motor 5 forms a drive unit 10 together with a controller 11 that drives and controls operation of the motor 5. The drive unit 10 is arranged forward from the top window 3 and between the roof panel 2 and a molded ceiling panel (not shown) located inward with respect to the passenger compartment (see FIG. 4).

Figure 2:
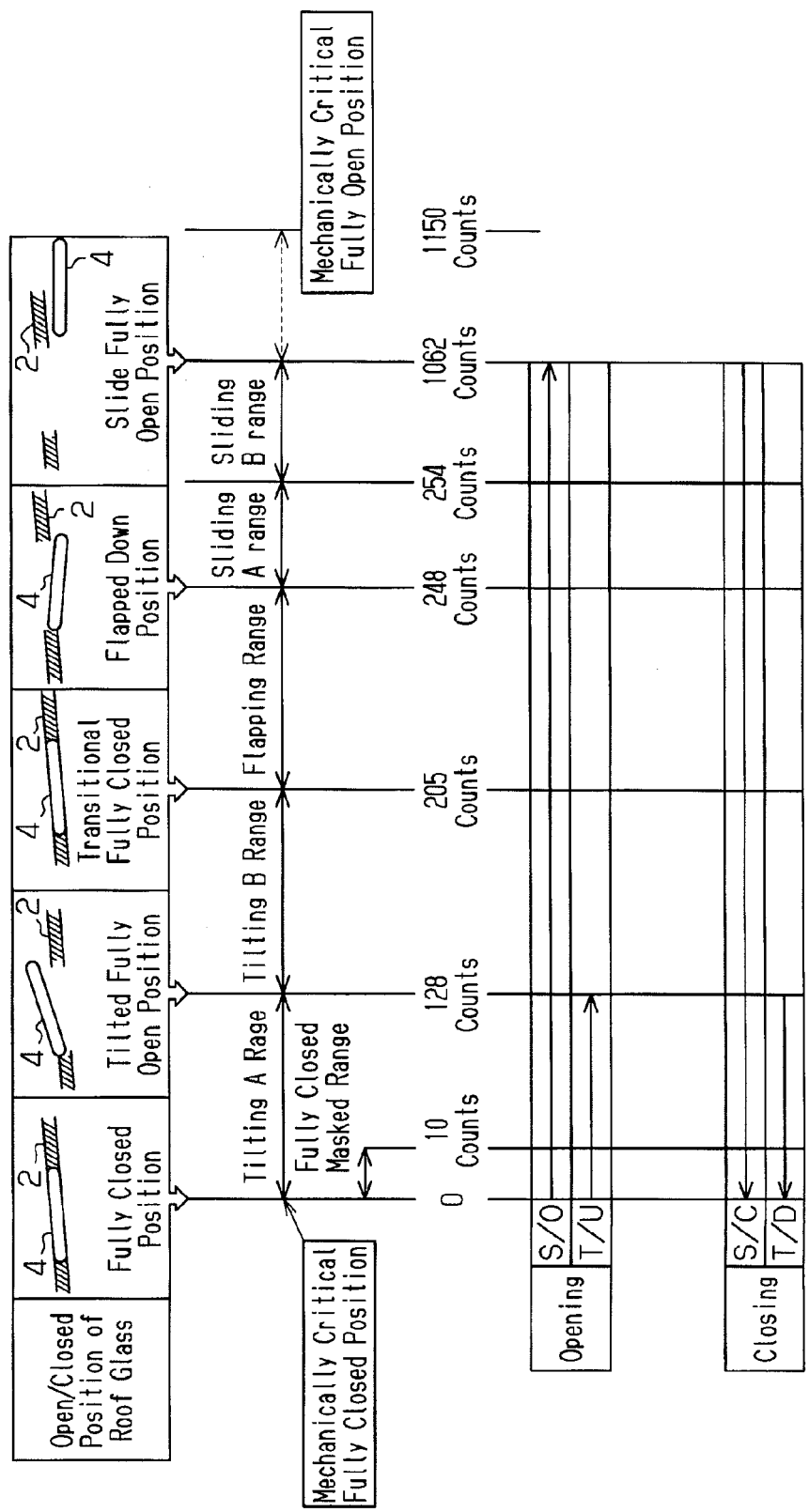
FIG. 2 is a view illustrating opening/closing of a roof glass.

As illustrated in FIG. 2, the roof glass 4 of the first embodiment is movable mainly to a fully closed position, a tilted fully open position, a transitional fully closed position, a flapped down position, and a slid fully open position. When the roof glass 4 is at the tilted fully open position, the rear end of the roof glass 4 is raised to the uppermost point toward the exterior of the passenger compartment with respect to the fully closed position. When the roof glass 4 is located at the flapped down position, the rear end of the roof glass 4 is lowered to the lowermost position toward the interior of the passenger compartment with respect to the transitional fully closed position. In the first embodiment, sequential movement of the roof glass 4 from the fully closed position to the tilted fully open position, the transitional fully closed position, the flapped down position, and the slid fully open position in this order is referred to as slide opening (S/O in FIG. 2). The reverse movement of the roof glass 4 is referred to as slide closing (S/C in FIG. 2). The slide opening/closing is carried out by manipulating a slide open switch SW2 and a slide close switch SW3, which will be explained later. Opening of the roof glass 4 from the fully closed position to the tilted fully open position is referred to as tilt opening (T/U in FIG. 2) and the reverse operation is referred to as tilt closing (T/D in FIG. 2). The tilt opening/closing is carried out by manipulating a tilt open switch SW4 and a tilt close switch SW5, which will be described later.

Figure 1:
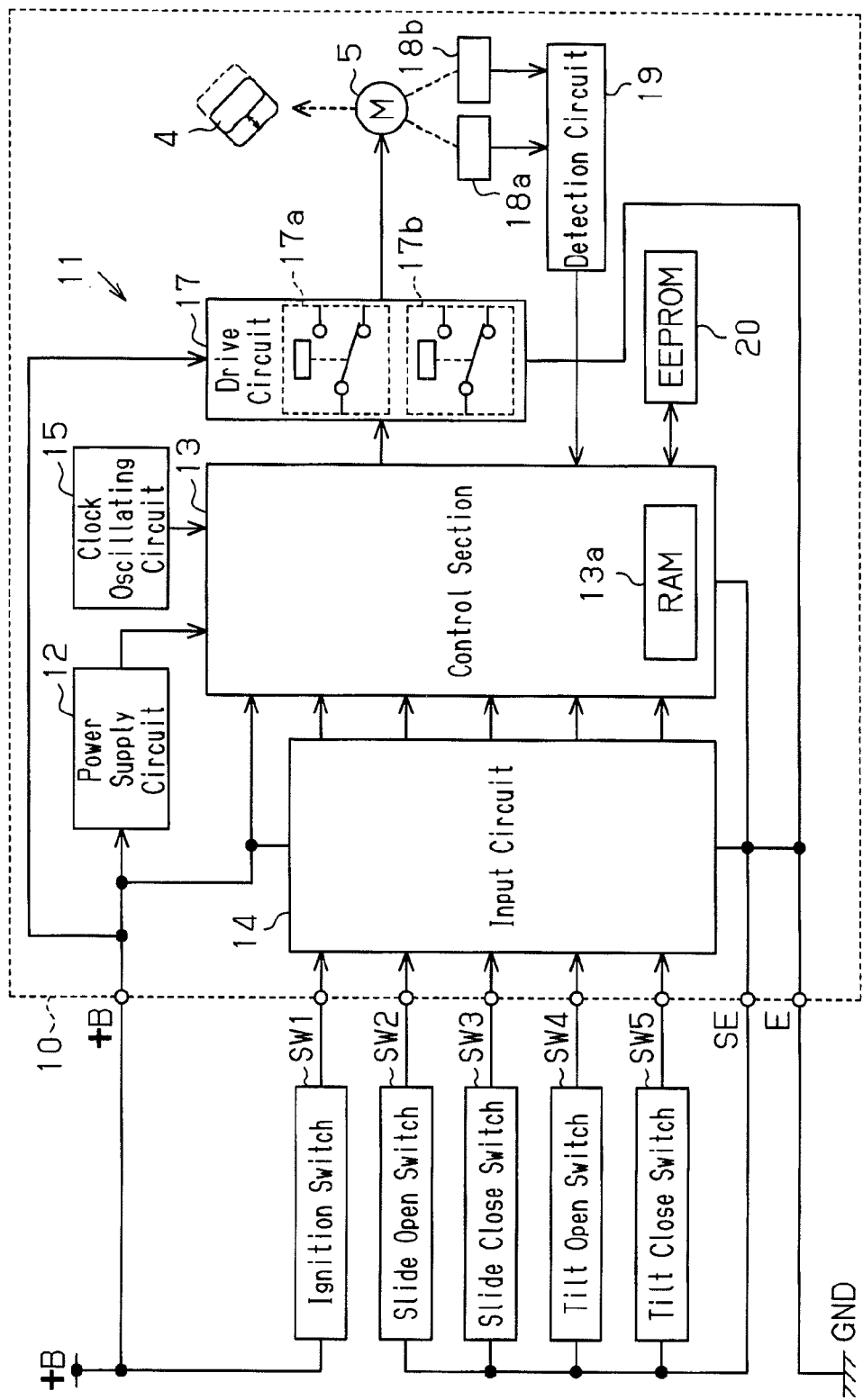
FIG. 1 is a block diagram representing the electric configuration of a sun roof apparatus according to a first embodiment of the present invention.

FIG. 1 is a block diagram representing the electric configuration of the sun roof apparatus. The controller 11, which drives and controls operation of the drive motor 5, is connected to a non-illustrated battery. The battery supplies drive voltage +B (which is, in the first embodiment, 12 [V]) to the controller 11. The drive voltage +B is regulated to a predetermined voltage by a power supply circuit 12 of the controller 11 and then supplied to a control section 13. The control section 13 functions as a storage state determining section, a motor state detecting section, a position difference determining section, a number of resetting determining section, and an initialization state switching section.

An ignition switch SW1 is connected to the controller 11. The ignition switch SW1 is connected to the control section 13 through an input circuit 14 of the controller 11. The ignition switch SW1 outputs a manipulation signal (an ON signal) to the control section 13 through the input circuit 14 in response to manipulation by the user. When receiving the ON signal, the control section 13 operates based on the drive voltage +B supplied through the power supply circuit 12.

The slide open switch SW2, the slide close switch SW3, the tilt open switch SW4, and the tilt close switch SW5 are connected to the controller 11. The switches SW2 to SW5 are connected to the control section 13 through the input circuit 14 of the controller 11. In response to manipulation by the user, the switches SW2 to SW5 output command signals (in the first embodiment, low-level (grounding-level) ON signals) to the control section 13 through the input circuit 14.

The control section 13 receives a reference clock signal, which is necessary in operation of the control section 13, from a clock oscillating circuit 15.

The control section 13 controls operation of the motor 5 by supplying the drive voltage +B to the drive motor 5 through a drive circuit 17. The drive circuit 17 has a first relay 17a and a second relay 17b. The relays 17a, 17b selectively permit and prohibit supply of the drive voltage +B to the drive motor 5 in such a manner as to correspondingly permit or prohibit forward or reverse rotation of the motor 5.

Once the slide open switch SW2 is manipulated, that is, when the ON signal is sent from the switch SW2 to the control section 13, the control section 13 turns on the first relay 17a to supply the drive voltage +B to the drive motor 5 to drive the drive motor 5, in such a manner as to cause opening (automatic opening) of the roof glass 4 from the fully closed position to the tilted fully open position, the transitional fully closed position, the flapped down position, and the slid fully open position in this order, regardless of an OFF signal input from the switch SW2 to the control section 13. When it is determined that the roof glass 4 is arranged at the slid fully open position through detection of the open/closed position of the roof glass 4, which will be explained later, the control section 13 blocks the supply of the drive voltage +B to the drive motor 5 by turning off the first relay 17a, thus stopping the opening of the roof glass 4.

Once the slide close switch SW3 is manipulated, that is, when the ON signal is sent from the switch SW3 to the control section 13, the control section 13 turns on the second relay 17b to supply the drive voltage +B to the drive motor 5 to drive the motor 5, in such a manner as to cause closing (automatic closing) of the roof glass 4 from the slid fully open position to the fully closed position occurs in the order reverse to the above-described order, regardless of an OFF signal input from the switch SW3 to the control section 13. When it is determined that the roof glass 4 is arranged at the fully closed position through detection of the open/closed position of the roof glass 4, the control section 13 stops the supply of the drive voltage +B to the drive motor 5 by turning off the second relay 17b, thus stopping the closing of the roof glass 4.

If either the slide open switch SW2 or the slide close switch SW3 is manipulated in the middle of the above-described automatic opening or automatic closing of the roof glass 4, the control section 13 suspends the supply of the drive voltage +B to the drive motor 5 to stop movement of the roof glass 4. If the slide open switch SW2 or the slide close switch SW3 is re-manipulated, the control section 13 supplies the drive voltage +B to the drive motor 5 in such a manner as to move the roof glass 4 from the stopped position to the slid fully open position or the slid fully closed position.

When the tilt open switch SW4 is manipulated, that is, when the ON signal is sent from the switch SW4 to the control section 13, the control section 13 turns on the first relay 17a to supply the drive voltage +B to the drive motor 5, thus driving the motor 5. In this manner, the control section 13 causes normal opening (manual opening) of the roof glass 4. If the tilt open switch SW4 is released from manipulation, that is, when an OFF signal is provided from the switch SW4 to the control section 13, the control section 13 turns off the first relay 17a to stop operation of the roof glass 4, thus stopping supply of the drive voltage +B to the drove motor 5. If it is determined that the roof glass 4 is located at the tilted fully open position through detection of the open/closed position of the roof glass 4, the control section 13 stops the supply of the drive voltage +B to the drive motor 5 to stop opening of the roof glass 4, in spite of manipulation of the tilt open switch SW4.

Contrastingly, when the tilt close switch SW5 is manipulated, that is, when the ON signal is sent from the switch SW5 to the control section 13, the control section 13 turns on the second relay 17b to supply the drive voltage +B to the drive motor 5, thus driving the motor 5. In this manner, the control section 13 causes normal closing (manual closing) of the roof glass 4. If the tilt close switch SW5 is released from manipulation, that is, when an OFF signal is provided from the switch SW5 to the control section 13, the control section 13 closes the second relay 17b to stop operation of the roof glass 4, thus stopping supply of the drive voltage +B to the drove motor 5. If it is determined that the roof glass 4 is located at the fully closed position through detection of the open/closed position of the roof glass 4, the control section 13 stops the supply of the drive voltage +B to the drive motor 5 to stop closing of the roof glass 4, even if the tilt close switch SW5 is being manipulated.

A pair of hall element magnetic sensors 18a, 18b are mounted on the substrate of the controller 11. The hall element magnetic sensors 18a, 18b detect the rotation cycle (the rotating speed) and the rotating direction of the drive motor 5. Specifically, a sensor magnet having a plurality of magnetic poles aligned in a circumferential direction is fixed the non-illustrated rotary shaft of the drive motor 5 in such a manner that the sensor magnet rotates integrally with the rotary shaft. The hall element magnetic sensors 18a, 18b are arranged in the vicinity of the sensor magnet. The hall element magnetic sensors 18a, 18b are spaced at a predetermined distance in the circumferential direction of the rotary shaft. In other words, in the first embodiment, the rotation sensor is a non-contact type rotation sensor employing magnetism. Rotation of the drive motor 5 causes each of the hall element magnetic sensors 18a, 18b to output a pulse-like output signal to the detection circuit 19 in correspondence with the rotation of the motor 5. The output signal (the pulse signal) provided by the hall element magnetic sensor 18a and the output signal (the pulse signal) provided by the hall element magnetic sensor 18b have a predetermined phase difference (which is, for example, ¼ cycle) with respect to each other. The detection circuit 19 shapes the waveform of the output signals (the pulse signals) and outputs the signals to the control section 13.

The control section 13 detects the rotation cycle (the rotating speed) of the drive motor 5 in accordance with the cycle of the output signal (the pulse signal) sent from the hall element magnetic sensors 18a, 18b to the control section 13 via the detection circuit 19.

In other words, when the slide open switch SW2 or the tilt open switch SW4 is manipulated and the ON signal is sent to the control section 13, the control section 13 adds "1" to the count value, which is open/closed position information, each time the control section 13 detects, for example, a rising edge or a falling edge of the output signal (the pulse signal) of the sensor 18b (see FIG. 2). Contrastingly, when the slide close switch SW3 or the tilt close switch SW5 is manipulated and the ON signal is input to the control section 13, the control section 13 subtracts "1" from the count value, which has been added up in an opening operation of the roof glass 4, each time the control section 13 detects a rising edge or a falling edge of the output signal (the pulse signal) of the sensor 18b. The control section 13 thus detects the open/closed position of the roof glass 4 in accordance with the obtained count value.

As illustrated in FIG. 2, in the first embodiment, the movement range of the roof glass 4 in which the count value corresponds to "10" or less is set as a fully closed masking range in which the roof glass 4 is considered as located at the fully closed position. The count value when the roof glass 4 is arranged at the tilted fully open position is "128". The count value when the roof glass 4 is located at the transitional fully closed position is "205". The movement range of the roof glass 4 in which the count value corresponds to "0" to "128" is referred to as a tilting A range. The movement range of the roof glass 4 in which the count value corresponds to "128" to "205" is referred to as a tilting B range. The count value when the roof glass 4 is arranged at the flapped down position is "248". The count value when the roof glass 4 is located at the slid fully open position is "1062". If the count value falls in the range of "248" to "254" (the sliding A range in FIG. 2), pinch determination, which will be explained later, is not performed. The pinch determination is carried out if the count value corresponds to "254" to "1062" (the sliding B range in FIG. 2). The count value when the roof glass is located at a mechanically critical position at the fully open side is "1150".

Original position setting (initial setting), in accordance with which the relative relationship between the roof glass 4 and the count value is determined, is performed if normal operation of the roof glass 4 cannot be performed, for example, when the automobile is being shipped or used. In the original position setting, with the roof glass 4 held at the mechanically critical position at the fully closed side, the tilt close switch SW5 is manipulated continuously for a predetermined time or longer or repeatedly more than a predetermined number of times, such that the roof glass 4 is moved further in the closing direction and the count value is thus set to "0". In other words, the count value is set to "0" in correspondence with the fully closed position of the roof glass 4. In this case, the control section 13 sets a original position set flag stored in an EEPROM 20, which will be described later, and switches initialization information to a set state.

The control section 13 detects the rotating direction of the drive motor 5 in accordance with the phase difference between the output signals (the pulse signals) from the hall element magnetic sensors 18a, 18b. The control section 13 then detects the movement direction of the roof glass 4 in accordance with detection of the rotating direction of the drive motor 5.

The control section 13 determines that a foreign object is pinched between the roof glass 4 and the roof panel 2 if the rotating speed of the drive motor 5 drops to a value smaller than a predetermined threshold value in the automatic closing of the roof glass 4. The control section 13 then operates to rotate the drive motor 5 in a reverse direction to move the roof glass 4 in the fully opening direction by a predetermined amount (corresponding to a predetermined count value). In this manner, the object is released from the roof glass 4 and the roof panel 2. In this state, the control section 13 switches operation on the count value from subtraction to addition in correspondence with reverse rotation of the drive motor 5.

The control section 13 has a RAM 13a serving as a memory. The control section 13 stores the count value, in accordance with which the open/closed position of the roof glass 4 is detected, in the RAM 13a as one type of learned data that is rewritten each time the count value changes. Specifically, the control section 13 stores the count value in an unmodified state as a regular value, together with a mirror value obtained by inverting the logical values of all the bits of the regular value.

The RAM 13a is a volatile memory and loses its data if deprived of power supply. Thus, if reset starting in which the drive voltage +B supplied to the RAM 13a through the power supply circuit 12 lowers to a value smaller than or equal to a predetermined level and then re-increases to a value greater than the level occurs, the control section 13 determines whether the count value stored in the RAM 13a is normally retained in the RAM 13a, on the presumption that the count value has possibly been deleted from the RAM 13a. In the following description, such determination is referred to as RAM checking. In the RAM checking, the control section 13 adds the regular value and the mirror value of the count value stored in the RAM 13a together. The control section 13 accomplishes the determination in accordance with the result of such addition.

Specifically, if the result of addition of the regular and mirror values shows that all bits are "1", the control section 13 determines that the RAM 13a normally retains the learned data (RAM checking: OK). In other words, since the mirror value is data obtained by inverting the logical values of all bits of the regular value, the result of the addition should show that all bits are "1" as long as the data is normally stored. However, if the result of the addition of the regular and mirror values shows that at least one of the bits is "C", the control section 13 determines that the learned data has been deleted from the RAM 13a (RAM checking: NG). In other words, if the power supply is suspended, some or all of the bits of the regular value and the mirror value become "0" and the result of the addition of the regular and mirror values shows that at least one of the bits is "0".

Further, for example, following the above-described original position setting, the control section 13 stores the regular value and the mirror value of the current count value in the EEPROM 20 of the controller 11 at a predetermined time point such as when the result of the RAM checking in starting of the drive motor 5 is normal or, alternatively, after a predetermined time (which is, for example, one second) elapses since stopping of the drive motor 5. The EEPROM 20 corresponds to a nonvolatile memory. The control section 13 also stores the initialization information (the original position set flag), which indicates whether the original position setting (the initial setting) has been carried out, in the EEPROM 20. Data of the EEPROM 20 is electrically deletable (rewritable). The EEPROM 20 is a nonvolatile memory that retains its data in spite of deprivation of power supply.

With reference to the flowchart of FIG. 3, a procedure performed by the control section 13 in the reset starting will be explained. The procedure is carried out if, as has been described, the drive voltage +B, which is supplied to the control section 13 via the power supply circuit 12, decreases to a value smaller than or equal to the predetermined level and then re-increases to a value greater than the level.

In step S1, the control section 13 clears prescribed data in the RAM 13a except for the count value (the open/closed position information), which is the learned data. The control section 13 then performs step S2.

In step S2, the control section 13 determines whether the RAM checking is "OK". Specifically, the control section 13 adds the regular value to the mirror value of the count value stored in the RAM 13a. If the result of such addition shows that all bits are "1", the control section 13 determines that the count value is normally stored in the RAM 13a (the RAM checking: OK) and carries out step S3.

In step S3, the control section 13 determines whether the initialization information has been set, that is, whether the original position set flag is in a set state. If the initialization information is in a non-set state, that is, if the original position set flag is in a cleared state, the control section 13 performs step S9. In step S9, the control section 13 writes in and stores the learned data including the count value (the regular value) currently memorized in the RAM 13a in the EEPROM 20. After such writing in the EEPROM, the control section 13 suspends the reset starting procedure. In this case, since the initialization information is in the non-set state, that is, the original position set flag is in the cleared state, the control section 13 determines that the control section 13 cannot perform in a normal operating mode such as the above-described manual opening/closing and automatic opening/closing. The control section 13 then switches to an inching mode in which the roof glass 4 is intermittently moved by an amount corresponding to a predetermined count value. In this manner, the user is informed of the need of resetting of the original position.

Contrastingly, if the initialization information is set, that is, the original position set flag is in a set state, in step S3, the control section 13 carries out step S4.

In step S4, the control section 13 determines the operating state of the drive motor 5. Specifically, the control section 13 detects the operating state of the drive motor 5 in accordance with the ON/OFF state of each relay 17a, 17b, which supplies the drive voltage +B to the drive motor 5. If the drive motor 5 is in a stopped state, that is, if it is the outcome is of step S4 is negative, the control section 13 performs step S9 and writes in the EEPROM, in the same manner as the above-described manner. In other words, if the drive motor 5 is in the stopped state, it is indicated that the roof glass 4 does not operate when the drive voltage +B becomes smaller than or equal to the predetermined level. Accordingly, it is determined that there is no difference between the actual open/closed position of the roof glass 4 and the count value stored in the RAM 13a.

Contrastingly, if it is determined that the drive motor 5 is in operation in step S4, the control section 13 performs step S5. Specifically, if the drive motor 5 is in operation, it is indicated that the roof glass 4 operates under the drive voltage +B smaller than or equal to the predetermined level. It is thus determined that it is likely that there is a difference between the actual open/closed position of the roof glass 4 and the count value of the RAM 13a.

If the roof glass 4 operates under the drive voltage +B smaller than or equal to the predetermined level, it is likely that the sensors 18a, 18b output output signals (pulse signals) having unusual waveforms, thus hampering counting. Even if the waveforms of the output signals (the pulse signals) are normal, the count values may not be obtained normally or writing in the RAM 13a may not be performed. Accordingly, in spite of the fact that the result of the RAM checking is OK, the control section 13 determines that there is a difference between the actual open/closed position of the roof glass 4 and the count value if the drive motor 5 (the roof glass 4) is in operation. The control section 13 thus carries out step S5.

In step S5, the control section 13 subtracts "1" from the acceptable number of resetting. The acceptable number of resetting is set after the initialization information has been set, that is, the original position flag has been switched to the set state. Specifically, there are a number of cases in which reset starting causes no or only slight difference between the actual open/closed position of the roof glass 4 and the count value. Thus, the acceptable number of resetting is determined considering, in several early cycles of resetting after the original position setting, the number of cycles that permits the aforementioned difference to remain in the acceptable range. In other words, the acceptable number of resetting is set to the value that permits the difference to remain in the acceptable range. After subtracting "1" from the acceptable number of resetting in step S5, the control section 13 carries out step S6.

In step S6, the control section 13 determines whether the acceptable number of resetting is smaller than a predetermined threshold value (which is, in the first embodiment, "zero"), that is, whether the difference between the actual open/closed position of the roof glass 4 and the count value is in the acceptable range. If the acceptable number of resetting is greater than the threshold value, the control section 13 determines that the difference is in the acceptable range and there is no need to perform the original position resetting. Then, in step S7, the control section 13 maintains the initialization information, that is, the original position set flag, in the set state and performs step S6. In this case, since the drive motor 5 is in operation, the control section 13 carries out the EEPROM writing after a predetermined time (which is, for example, one second) elapses since stopping of the drive motor 5.

Contrastingly, if the acceptable number of resetting is smaller than the threshold value in step S6, the control section 13 determines that it is highly likely that the difference exceeds the acceptable range and thus the original position resetting must be carried out. Thus, in step S8, the control section 13 switches the initialization information to the non-set state, that is, clears the original position set flag. The control section 13 then carries out step S9. Also in this case, since the drive motor 5 is in operation, the control section 13 carries out the EEPROM writing after a predetermined time (which is, for example, one second) elapses since stopping of the drive motor 5. As has been described, if the initialization information is in the non-set state, that is, the original position set flag is in the cleared state, the control section 13 switches from the normal operating mode, such as the manual or auto opening/closing, to the inching mode, in which the roof glass 4 is intermittently actuated by the amount corresponding to the predetermined count value. This informs the user of the need to perform the original position resetting.

If, in the RAM checking of step S2, the result of the addition of the regular value and the mirror value of the count value stored in the RAM 13a shows that at least one bit is "0", that is, not all bits are "1", the control section 13 determines that the learned data has been deleted from the RAM 13a (RAM checking: NG). In other words, the control section 13 determines that the original position of the roof glass 4 has been lost and thus the normal operation of the roof glass 4 is prevented. The control section 13 then carries out step S10. Specifically, the control section 13 clears the learned data (including the count value) from the RAM 13a in step S10 and then carries out step S11.

In step S11, the control section reads out the learned data including the count value from the EEPROM 20 and writes the data in the RAM 13a. In this manner, the control section 13 recognizes the open/closed position of the roof glass 4, which has been lost, again, and permits continuous operation of the roof glass 4.

As has been described, in the first embodiment, through such reset starting, the difference between the actual open/closed position of the roof glass 4 and the count value stored in the RAM 13a at the time of reset starting is eliminated by carrying out the original position resetting. Further, by setting the acceptable range for such difference, the necessity to repeat the original position resetting each time the reset starting is performed, which is troublesome, is eliminated.

The first embodiment has the following advantages.

(1) The control section 13 of the first embodiment detects the number of the reset starting cycles and determines whether the number is in the acceptable range (steps S5 and S6). If it is determined that the number of the reset starting cycles exceeds the acceptable range, the control section 13 switches the initial setting of the relationship between the actual open/closed position of the roof glass 4 and the count value in the RAM 13a to the non-set state (step S8). That is, by switching the initial setting to the non-set state when the number of the reset starting cycles exceeds the acceptable range to inform the user of the need to re-perform the initial setting, the necessity to repeat the initial setting each time the reset starting occurs, which is troublesome, is eliminated. Further, the control section 13 detects the number of the reset starting cycles after the initial setting is switched to the set state and then performs determination. This allows the initial setting to be carried out at a further optimal time point.

(2) In the first embodiment, the RAM 13a stores the regular value and the mirror value of the RAM 13a. The control section 13 determines whether the count value is normally retained in accordance with the result of addition of the regular value and the mirror value. If the count value is retained normally, the result of the addition shows that all bits are "1". If not, the result of the addition shows that at least one of the bits is "0". This makes it easy for the control section 13 to determine whether the count value is normally stored in the RAM 13a.

(3) In the first embodiment, the count value stored in the RAM 13a is written in the EEPROM 20 at predetermined time points. Thus, even if the storage state of the RAM 13a becomes abnormal, the count value is restored easily by reading out the count value from the EEPROM 20.

A power window apparatus according to a second embodiment of the present invention, which is mounted in an automobile 21, will hereafter be described with reference to the drawings. Same or like reference numerals are given to components of the second embodiment that are the same as or like corresponding components of the first embodiment and description of these components will be omitted.

Figure 5:
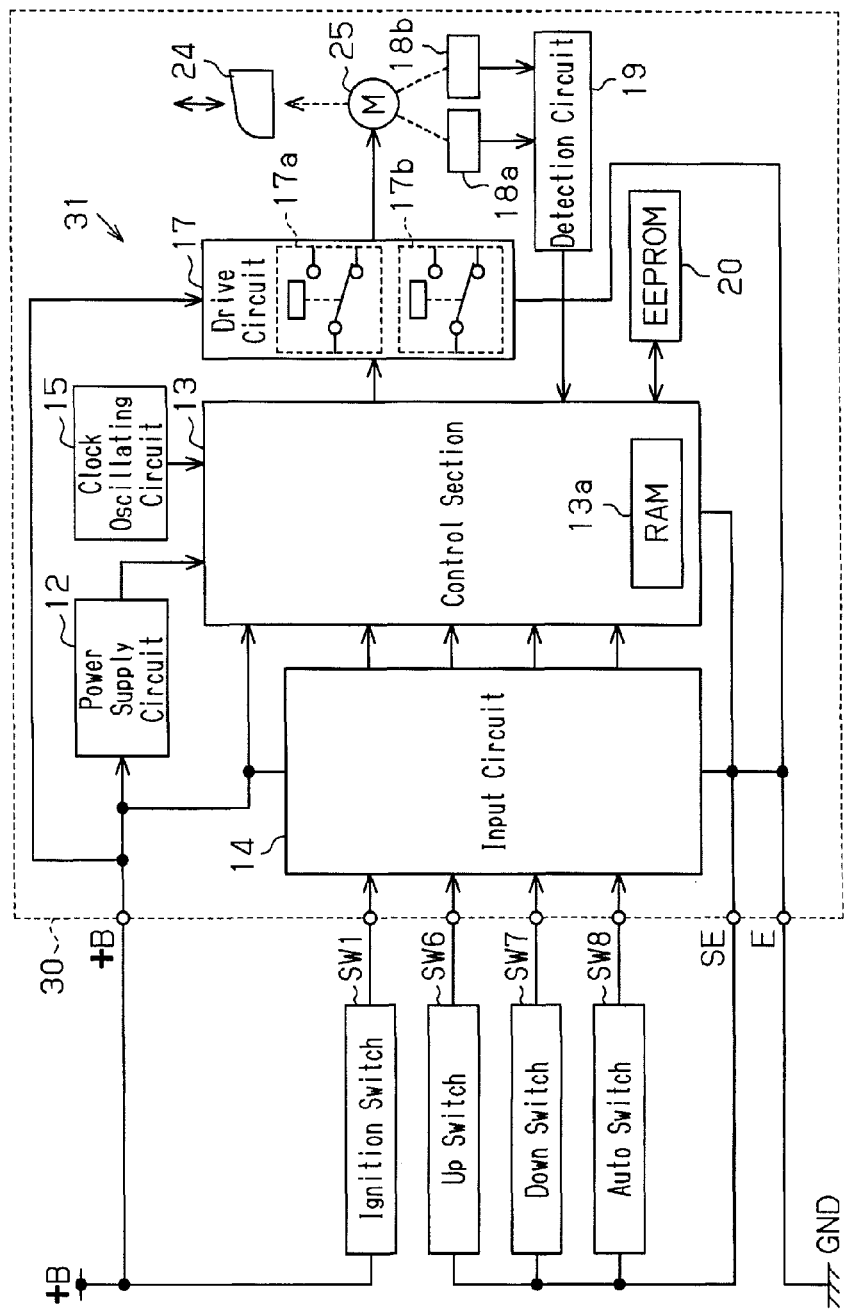
FIG. 5 is a block diagram representing the electric configuration of a power window apparatus according to a second embodiment of the present invention.
Figure 6:
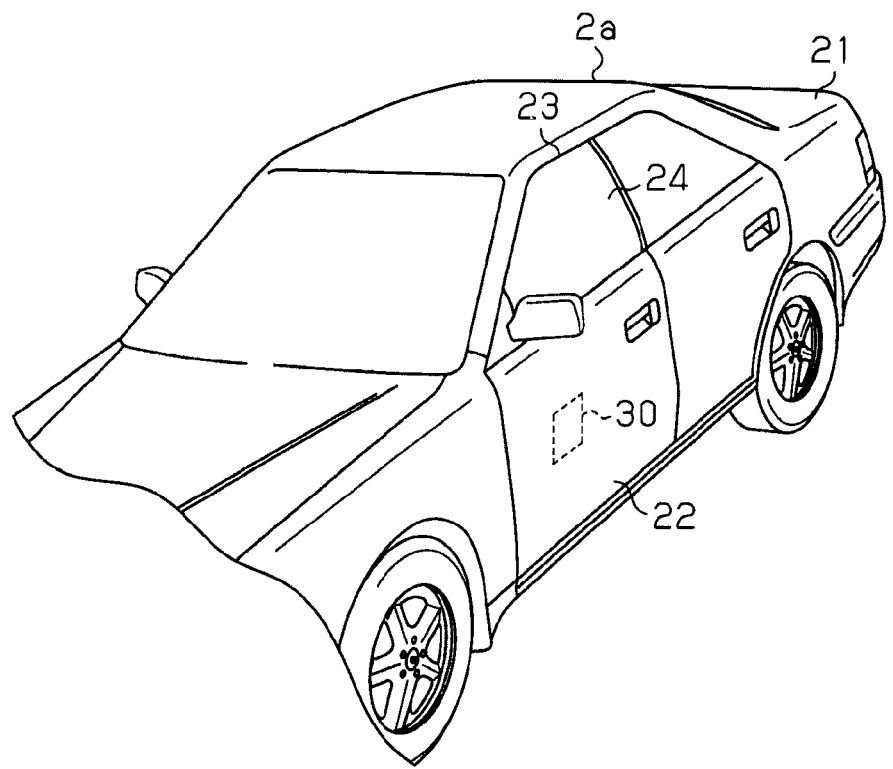
FIG. 6 is a perspective view showing a main portion of an automobile in which the power window apparatus of FIG. 5 is mounted.

FIG. 6 is a perspective view showing a main portion of the automobile 21 in which the power window apparatus is installed. With reference to FIG. 6, a door 22 is formed at a side surface of the automobile 21. The door 22 includes a window 23, which is selectively opened and closed by a window glass 24, which is an open/close member, provided in the door 22. The window glass 24 is movable in the up-and-down direction with respect to the body frame 2a of the automobile 21. The window glass 24 is selectively opened and closed through a non-illustrated drive force transmitting mechanism in correspondence with driving by a drive motor 25 shown in FIG. 5. The drive motor 25 forms a drive unit 30 together with a controller 31, which drives the motor 25 as will be explained later. The drive unit 30 is arranged in the interior of the door 22.

FIG. 5 is a block diagram representing the electric configuration of the power window apparatus (the controller) 31, which controls operation of the drive motor 25. The controller 31 controlling operation of the drive motor 25 is configured identically with the controller 11 according to the first embodiment.

Specifically, switches SW6 to SW8 that are manipulated to selectively open and close the window glass 24, that is, an up switch (a close switch) SW6, a down switch (an open switch) SW7, and an auto switch SW8, are connected to the controller 31. When manipulated by the user, each of the switches SW6 to SW8 outputs a command signal (a low-level (ground-level) ON signal) to the control section 13 through an input circuit 14.

In response to manipulation of the up switch SW6, the control section 13 actuates the drive motor 25 through a drive circuit 17 to raise (close) the window glass 24 continuously for the time in which such manipulation lasts. In response to manipulation of the down switch SW7, the control section 13 operates the drive motor 25 through the drive circuit 17 to lower (open) the window glass 24 continuously for the time in which such manipulation lasts.

When the auto switch SW8 is manipulated, one of the switch SW6 and the switch SW7 is manipulated. Manipulation of the auto switch SW8 causes the control section 13 to drive the drive motor 25 through the drive circuit 17 to close or open (automatic close or automatic open) the window glass 24 to the fully closed position or the fully open position.

As in the first embodiment, the control section 13 performs counting in accordance with output signals (pulse signals) provided by hall element magnetic sensors 18a, 18b through a detection circuit 19. The control section 13 then detects the open/closed position of the window glass 24 in correspondence with the counted value. Original position setting (initial setting) in accordance with which the relative relationship between the window glass 24 and the count value is determined is performed if normal operation is completely prohibited, for example, when the automobile is being shipped or used. In the original position setting, while the window glass 24 is held at the mechanically critical position at the fully closing side, the up switch SW6 is manipulated continuously for a predetermined time or longer or repeatedly more than a predetermined number of times in such a manner that the window glass 24 is moved further in the closing direction. This sets the count value to "0". The control section 13 then sets the original position set flag.

The control section 13 detects the rotating direction of the drive motor 25 in accordance with the phase difference of the output signals (the pulse signals) to detect the opening/closing direction of the window glass 24. Further, while the window glass 24 is in the automatic closing operation, the control section 13 continues determination whether a foreign object has been caught in accordance with the rotating speed of the drive motor 25.

The control section 13 of the second embodiment stores the count value, in accordance with which the open/closed position of the window glass 24 is detected, in a RAM 13a. If the reset starting, in which the drive voltage +B drops to a value smaller than or equal to a predetermined level and then re-increases to a value greater than the level, occurs, the control section 13 performs the reset starting procedure represented in FIG. 3, as in the case of the first embodiment. In this manner, in the second embodiment, the difference between the actual open/closed position of the window glass 24 and the count value is eliminated in the reset starting through the original position resetting, like the first embodiment. Also, an acceptable range is set for such difference and the need to repeat the original position resetting each time the reset starting is carried out, which is troublesome, is eliminated.

The illustrated embodiments of the present invention may be modified as follows.

Figure 3:
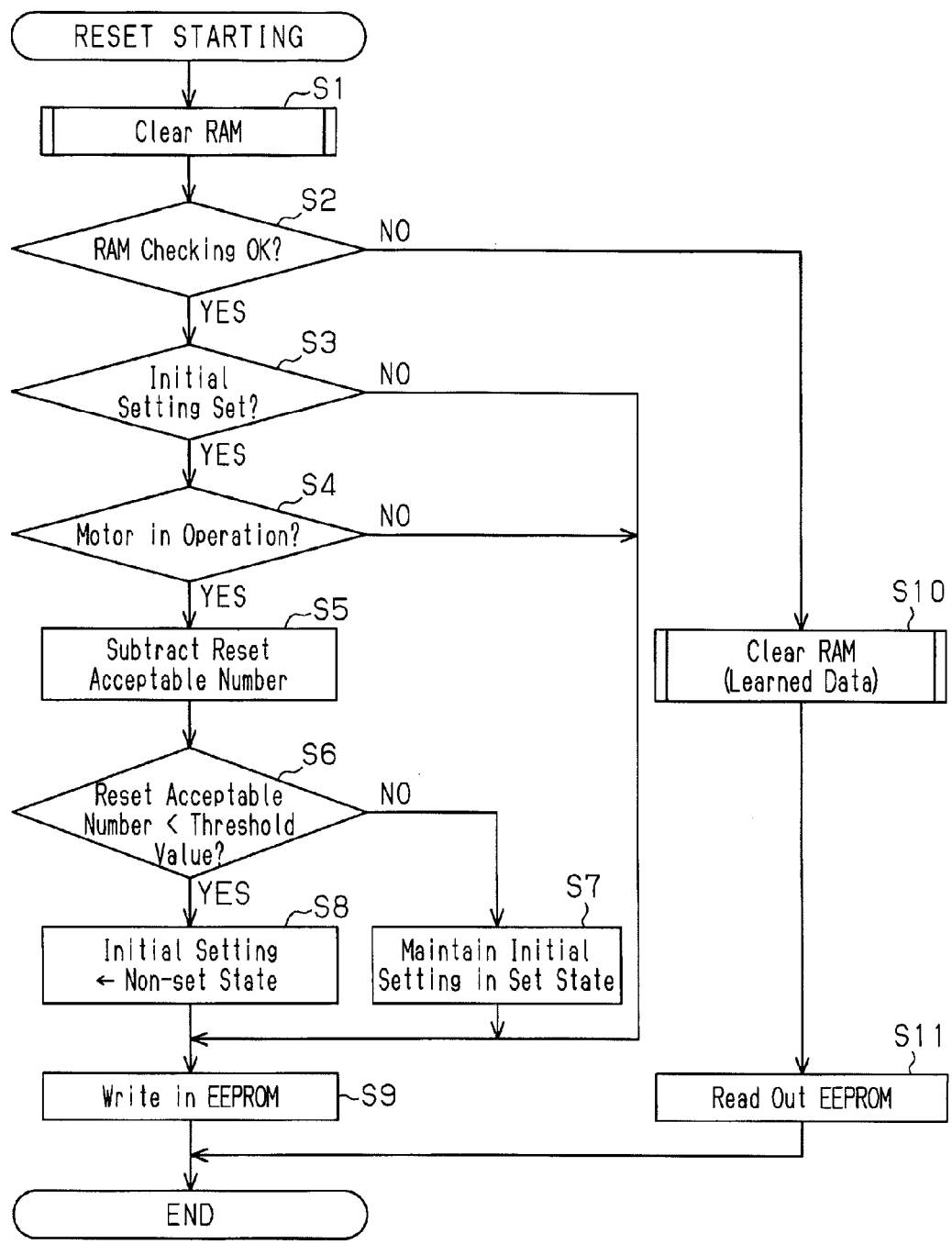
FIG. 3 is a flowchart representing a reset starting procedure.

The reset starting procedure of FIG. 3 may be modified as needed. For example, although the acceptable number of resetting is subjected to subtraction in step S5 to determine whether the obtained number is less than the threshold value in step S6, the acceptable number of resetting may be subjected to addition to determine whether the obtained number exceeds the threshold value. Also, although the RAM checking is carried out prior to determination of the operating state of the motor, the determination of the motor operating state may be followed by the RAM checking.

In each of the illustrated embodiments, the control section 13 performs the RAM checking through addition of the regular value and the mirror value of the count value. However, the method of the RAM checking is not restricted to this but may use only the regular value.

In resetting of the original position, initial setting of the count value may be performed while the open/close member (the roof glass 4 or the window glass 24) is located at the mechanically critical position at the fully open side.

In the illustrated embodiments, the operating state of the drive motor 5, 25 is detected in accordance with the ON/OFF state of each relay 17a, 17b. However, the operating state of the drive motor 5, 25 may be detected in any other suitable manner.

In the illustrated embodiments, it is determined that a foreign object is caught by the open/close member (the roof glass 4 or the window glass 24) if the rotating speed of the drive motor 5, 25 drops to a value smaller than the predetermined threshold value. However, such determination may be carried out in any other suitable manner.

The rotation cycle (the rotating speed) and the rotating direction of the drive motor 5, 25 may be detected using any suitable component other than the hall element magnetic sensors 18a, 18b. For example, a magnetic resistance element that has resistance variable in correspondence with change of a magnetic field may be employed. Alternatively, an optical rotation sensor, for example, may be used other than these non-contact type magnetic sensors. Further, a contact type rotation sensor using a slidable contact may be employed.

In the first embodiment, the present invention is embodied as the sun roof apparatus that tilts temporarily and then slides, as illustrated in FIG. 2. However, the invention is not restricted to this but may be embodied as a sun roof apparatus that performs sliding and tilting independently. Alternatively, the invention may be embodied as a sun roof apparatus that performs only sliding or tilting.

In the illustrated embodiments, the present invention is embodied as the sun roof apparatus having the roof glass serving as the open/close member or the power window apparatus that employs the window glass serving as the open/close member. However, the invention may be embodied as any other suitable apparatus mounted in an automobile such as a sliding door apparatus including a sliding door serving as an open/close member. Alternatively, the invention may be embodied as an apparatus that selectively opens and closes an open/close member of any suitable object other than automobiles.

What is claimed is:

1. An apparatus that controls opening and closing of an open/close member based on a supply of a drive voltage, the apparatus comprising:

a drive motor that is actuated to selectively open and close the open/close member;

a memory that stores a count value changing in correspondence with operation of the drive motor, the memory storing the count value each time the count value changes;

a storage state determining section that determines whether the count value is normally stored in the memory when a reset starting, in which the drive voltage drops to a value smaller than or equal to a predetermined level and then re-increases to a value greater than the level, occurs;

a motor state detecting section that detects whether the drive motor is in operation;

a position difference determining section, wherein if, in the reset starting, it is determined that the count value is normally stored and it is detected that the drive motor is in operation, the position difference determining section determines that it is likely that there is a difference between an actual open/closed position of the open/close member and the count value stored in the memory;

a non-volatile memory that stores initialization information that indicates whether initial setting of the relationship between the actual open/closed position of the open/close member and the count value has been carried out;

a number of reset determining section that, if it is determined that it is likely that there is a difference between the actual open/closed position of the open/close member and the count value stored in the memory, detects the number of cycles of the reset starting and determines whether the detected number of the reset starting cycles is in a predetermined acceptable range;

a switching section that, if it is determined that the number of the reset starting cycles exceeds the acceptable range, switches the initialization information, in accordance with which the relative relationship between the actual open/closed position of the open/close member and the count value stored in the memory is determined, to a non-set state; and a maintaining section that, if it is determined that it is likely that there is a difference between the actual open/closed position of the open/close member and the count value stored in the memory, and if it is also determined that the number of the reset starting cycle does not exceed the acceptable range, maintains the initialization information in the set state;

wherein, if the maintaining section maintains the initialization information in the set state, the number of the reset starting cycles is written in the non-volatile memory.

2. The apparatus according to claim 1, wherein the number of reset determining section detects the number of the reset starting cycles since the initialization information is switched to a set state.

3. The apparatus according to claim 1, wherein, each time the count value changes, the memory stores a regular value of the count value and a mirror value obtained by inverting the logical values of all the bits of the regular value, and wherein the storage state determining section determines whether the count value is normally stored in accordance with the result of a predetermined logical operation using the regular value and the mirror value.

4. The apparatus according to claim 1, wherein the non-volatile memory stores the count value stored in the memory at a predetermined time point.

5. A method for controlling operation of a motor for opening and closing of an open/close member based on a supply of a drive voltage, the method comprising:

storing in a memory a count value that changes in correspondence with operation of a drive motor operating to selectively open and close the open/close member, each time the count value changes;

determining whether the count value is normally stored in the memory in a reset starting, in which the drive voltage drops to a value smaller than or equal to a predetermined level and then re-increases to a value greater than the level;

detecting whether the drive motor is in operation;

determining that it is likely that there is a difference between an actual open/closed position of the open/close member and the count value stored in the memory if, in the reset starting, it is determined that the count value is normally stored and it is detected that the drive motor is in operation;

storing, in a non-volatile memory, initialization information that indicates whether initial setting of the relationship between the actual open/closed position of the open/close member and the count value has been carried out;

if it is determined that it is likely that there is a difference between the actual open/closed position of the open/close member and the count value stored in the memory, detecting the number of cycles of the reset starting and determining whether the detected number of the reset starting cycles is in a predetermined acceptable range; and switching the initialization information in accordance with which the relative relationship between the actual open/closed position of the open/close member and the count value stored in the memory is determined, to a non-set state if it is determined that the number of the reset starting cycles exceeds the acceptable range; and if it is determined that it is likely that there is a difference between the actual open/closed position of the open/close member and the count value stored in the memory, and if it is determined that the number of the reset starting cycles does not exceed the acceptable range, maintaining the initialization information in the set state, and writing in the non-volatile memory the number of the reset starting cycles.

* * * * *